(12) United States Patent
Longer

(10) Patent No.: US 6,607,639 B1
(45) Date of Patent: Aug. 19, 2003

(54) PROCESS FOR DESALINIZATION UTILIZING HUMIDIFICATION/ DEHUMIDIFICATION

(76) Inventor: David E. Longer, 2387 Twelve Oaks Dr., Fayetteville, AR (US) 72703

( * ) Notice: Subject to any disclaimer, the term of this patent is extended or adjusted under 35 U.S.C. 154(b) by 0 days.

(21) Appl. No.: 09/932,721

(22) Filed: Aug. 17, 2001

(51) Int. Cl.[7] .............................. B01D 3/42; C02F 1/04; C02F 1/14
(52) U.S. Cl. .............................. 203/10; 203/2; 203/22; 203/100; 203/DIG. 1; 203/DIG. 17; 157/47.1; 210/737; 210/774
(58) Field of Search .............................. 203/10, 2, 100, 203/22, DIG. 1, DIG. 17, 88, DIG. 8; 202/234; 159/903, 47.1; 210/774, 737

(56) References Cited

U.S. PATENT DOCUMENTS

| | | | |
|---|---|---|---|
| 867,143 A | * 9/1909 | Laidlaw | 202/152 |
| 2,820,744 A | 1/1958 | Lighter | |
| 3,192,133 A | 6/1965 | Adamec | |
| 3,257,291 A | 6/1966 | Gerber | |
| 3,785,931 A | 1/1974 | Coffey | |
| 3,846,984 A | * 11/1974 | Siegel | 60/509 |
| 3,987,629 A | * 10/1976 | Pecar | 60/516 |
| 4,135,985 A | 1/1979 | La Rocca | |
| 4,151,046 A | 4/1979 | Eidelberg | |
| 4,192,850 A | * 3/1980 | Spevack | 422/255 |
| 4,267,022 A | * 5/1981 | Pitcher | 202/185.3 |
| 4,363,703 A | 12/1982 | El Difrawi et al. | |
| 4,383,891 A | * 5/1983 | Clavier | 159/903 |
| 4,402,793 A | 9/1983 | Petrek et al. | |
| 4,664,752 A | * 5/1987 | Zievers et al. | 202/182 |
| 4,698,135 A | * 10/1987 | Raab | 159/903 |
| 6,367,257 B1 | * 4/2002 | Witt et al. | 60/641.15 |

FOREIGN PATENT DOCUMENTS

| | | |
|---|---|---|
| FR | 646768 | 11/1928 |
| GB | 2066681 | 11/1980 |
| GB | 2176714 | 1/1987 |
| JP | 040134486 A | 2/1989 |

* cited by examiner

Primary Examiner—Virginia Manoharan

(57) ABSTRACT

A desalinization process and apparatus utilizing a humidity chamber having a saltwater structure; a cooling water structure and a salt-free water collection structure. Saltwater having a first temperature and cooling water having a second temperature are introduced into the humidity chamber. The temperature difference between the saltwater and the water running through the water coil create a temperature gradient causing salt-free water to distill from the saltwater. The salt-free water is then collected.

4 Claims, 6 Drawing Sheets

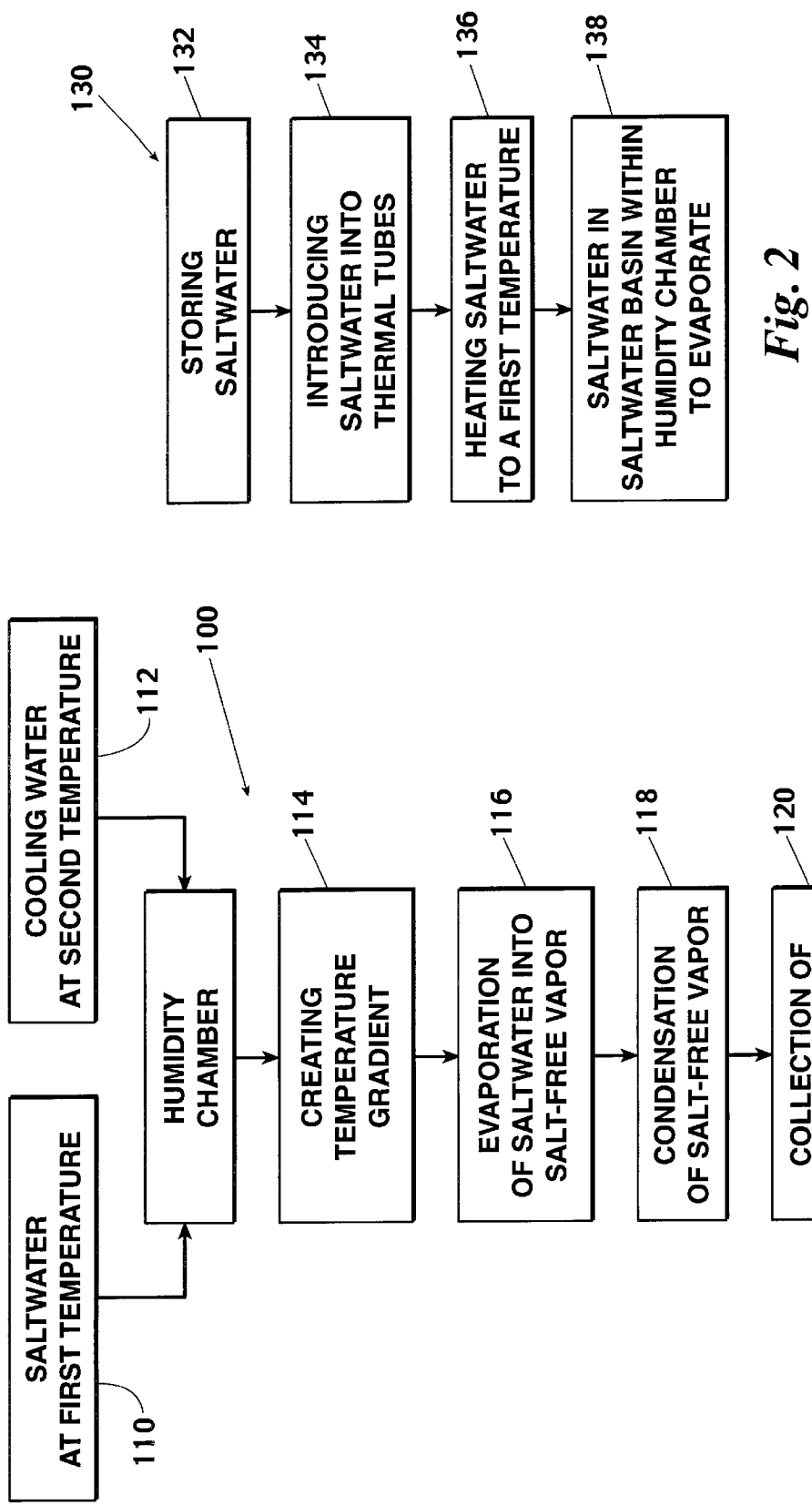

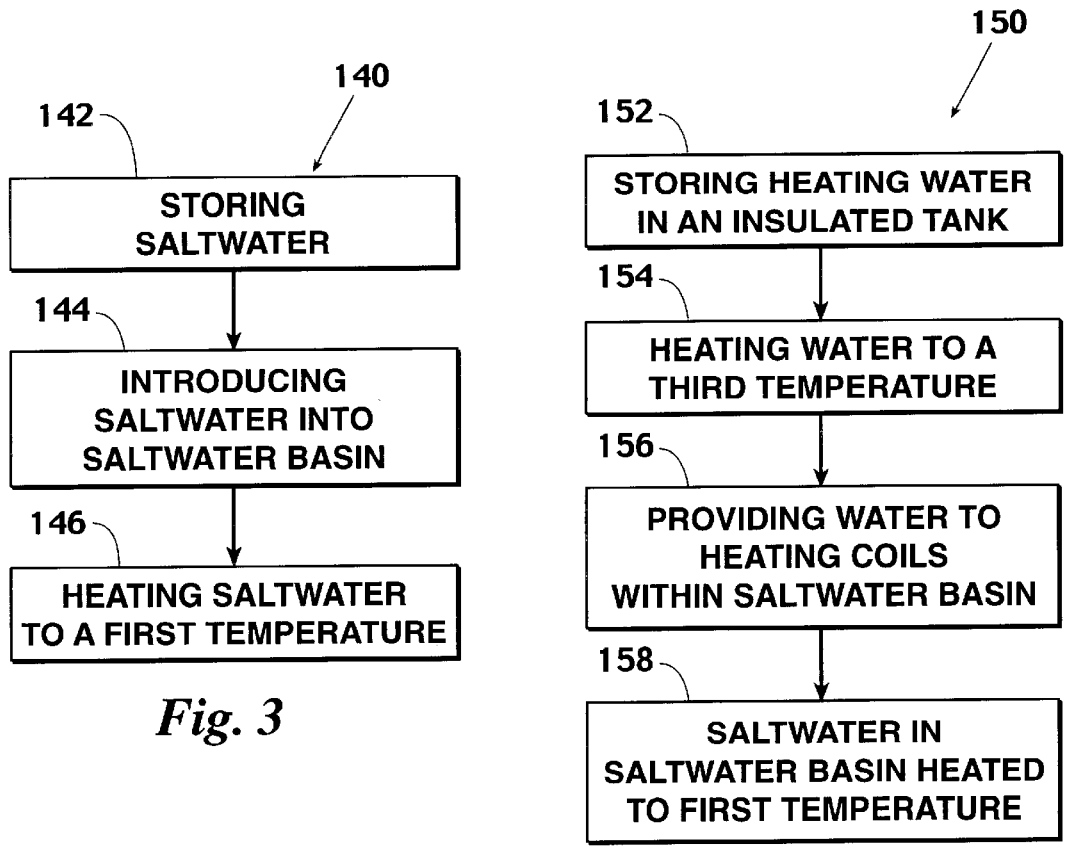
Fig. 3
Fig. 4
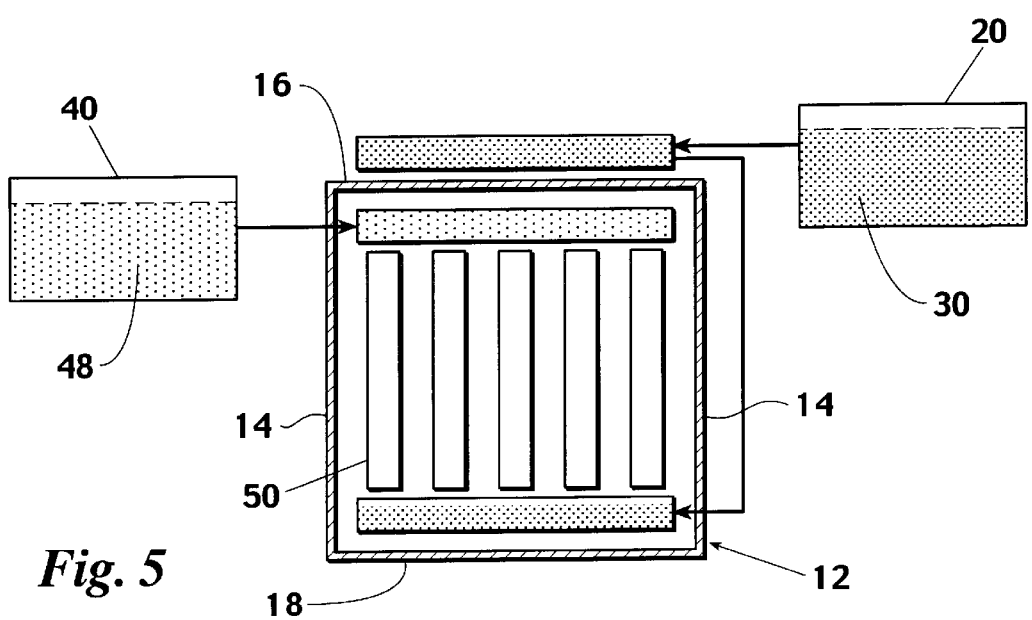
Fig. 5

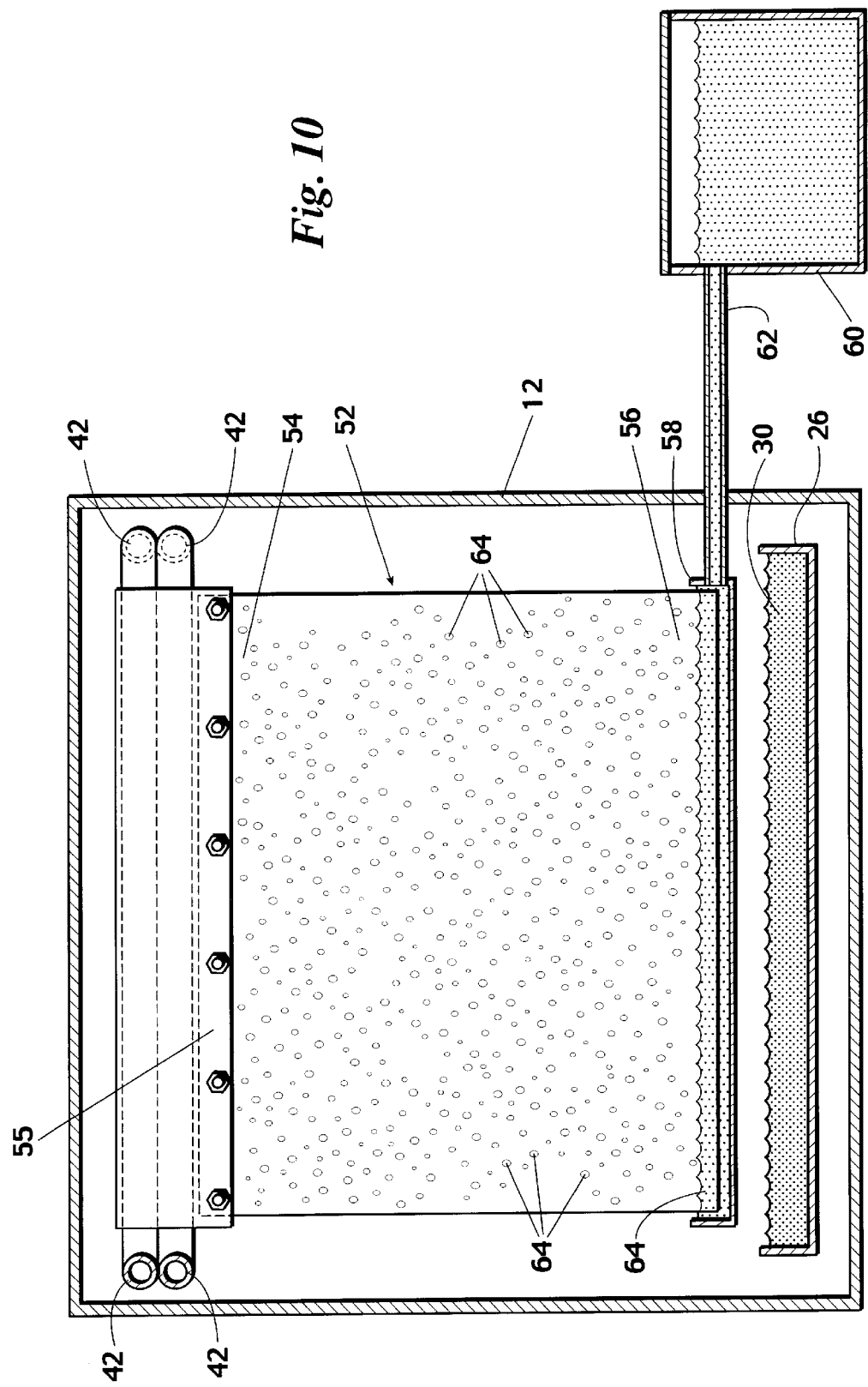

PROCESS FOR DESALINIZATION UTILIZING HUMIDIFICATION/ DEHUMIDIFICATION

BACKGROUND OF THE INVENTION

1. Field of the Invention

The present invention is generally directed toward an apparatus and process for the desalinization of saltwater. More specifically, the present invention is directed toward an apparatus and process utilizing a humidity chamber for the desalinization of saltwater.

2. Background

Fresh water is.a necessity for human life. The increased population, however, has put a strain on the world's fresh water resources. With the diminishing supply of fresh water resources, there is a need to convert saltwater into fresh water.

Various efforts to desalinize saltwater are known in the prior art which include very large and complicated processing facilities. The disadvantages associated with these facilities include their lack of portability, their lack of global application and their extreme cost in development and operation. There is thus a need for a desalinization apparatus and process which is globally accessible, efficient and economically affordable.

BRIEF SUMMARY OF THE INVENTION

The present invention satisfies the needs discussed above. The present invention is generally directed toward a desalinization process and apparatus, more specifically toward a desalinization process and apparatus utilizing a humidity chamber.

One aspect of the inventive apparatus comprises a humidity chamber comprising a saltwater structure providing saltwater at a first temperature; a cooling water structure providing cooling water at a second temperature which is relatively cooler than the saltwater; and a fresh water collection structure. The temperature difference between the saltwater and the relatively cooler water creates a temperature gradient.

The temperature gradient establishes atmospheric conditions favorable for the evaporation of the saltwater. When evaporation occurs, salt-free water vapor, otherwise know as fresh water vapor, separates from the salt related constituent compounds found in the saltwater. This vapor then forms as condensation along the fresh water collection structure which can then be collected.

One aspect of the humidity chamber of the inventive apparatus comprises a rectangular box configuration having an interior and an exterior. A portion of the saltwater structure is located along the interior bottom of the humidity chamber, while a portion of the cooling water structure is located proximate to the interior top of the humidity chamber. A portion of the fresh water collection structure is located between those portions of the saltwater structure and the cooling water structure found within the interior of the humidity chamber. It would be understood by those skilled in the art that the humidity chamber can assume various configurations including but not limited to a rectangular or a cylindrical configuration.

One aspect of the saltwater structure of the inventive apparatus comprises a series of thermal tubes, a saltwater feed container located outside the humidity chamber and a saltwater basin located within the humidity chamber. The saltwater feed container stores a supply of saltwater which is heated by the thermal tubes to a first temperature and supplied into the saltwater basin. The heated saltwater will then be subject to evaporation due to the temperature gradient created by the temperature difference between the saltwater and the cooling water. These items are interconnected by various saltwater feed tubes.

Another aspect of the saltwater structure of the inventive apparatus comprises a flat plat solar collector in a closed loop configuration with an insulated tank. Heating water which is within the closed loop is heated to a third temperature and stored within the insulated tank. The temperature of the heating water is relatively hotter than the saltwater's temperature. The heating water is provided into one or more heating coils located within the saltwater basin. The heat emitted from the heating coils will heat the saltwater to a desired temperature. This heated water can be utilized either independently or in combination with other saltwater heating processes, such as the use of thermal tubes as set out above. When used in combination, it maintains the temperature of the heated saltwater in the event the companion saltwater heating process is unable to provide adequate heat due to dark period, early morning hours or during periods of non-conducive periods.

One aspect of the cooling water structure of the inventive apparatus comprises a cooling coil located within the humidity chamber and a cold water feed container located outside the humidity chamber which supplies cooling water to the cooling coil by a cold water feed tube.

One aspect of the fresh water collection structure of the inventive apparatus comprises one or more condensation sheets each of which has a fresh water collection trough. The salt-free water vapor forms as condensation as salt-free water droplets along the condensation sheets. These salt-free water droplets transfer by gravity to the collection trough. The salt-free water is then collected in a salt-free water storage container located outside the humidity chamber by a salt-free water feed tube.

One aspect of the inventive desalinization process of the present invention comprises creating atmospheric conditions within a humidity chamber suitable to cause saltwater to evaporate separating the water molecules from the salt-related constituent compounds by introducing saltwater at a first temperature and cooling water at a second temperature into the chamber causing a temperature gradient to be formed, and providing a location upon which the evaporated water molecules can condense and be collected.

In yet another aspect of the inventive process is the temperature gradient between the saltwater and the cooling water which is maintained at a temperature range over a period of time varying from 50 to 75 degrees Fahrenheit.

Further objects, features and advantages of the present invention will be apparent to those skilled in the art upon reference to the accompanying drawings and upon reading the following description of the preferred embodiments.

BRIEF DESCRIPTION OF THE DRAWINGS

FIG. 1 provides a schematic outline of an embodiment of a process for desalinization provided by the present invention.

FIG. 2 provides a schematic outline of an embodiment of a process for the heating of the saltwater as utilized in the inventive process of the present invention.

FIG. 3 provides a schematic of an additional embodiment of the process for the heating of the saltwater as utilized in the inventive process of the present invention.

FIG. 4 provides a schematic of an embodiment 150 to heat saltwater located within the saltwater basin.

FIG. 5 provides a perspective view of an embodiment of an apparatus for desalinization provided by the present invention.

FIG. 10 provides a side cross-sectional view of an embodiment of salt-free water condensation and collection structure provided by the present invention.

DETAILED DESCRIPTION OF THE PREFERRED EMBODIMENTS

Figure 6:
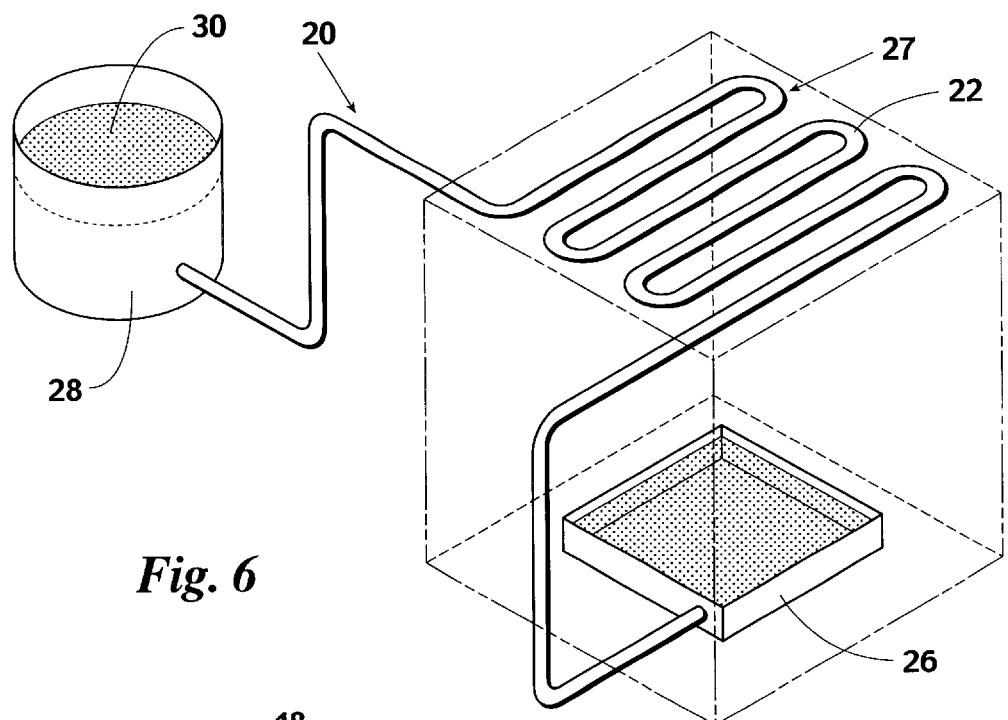
FIG. 6 provides a perspective view of an embodiment of a saltwater structure provided by the present invention.

Before explaining the present invention in detail, it is to be understood that the invention is not limited in its application to the details of the construction and arrangement of parts illustrated in the accompanying drawings. The invention is capable of other embodiments and of being practiced or carried out in a variety of ways. It is to be understood that the phraseology and terminology employed herein are for the purpose of description and not of limitation.

FIG. 1 illustrates a schematic of an embodiment 100 of the inventive process of the present invention. Embodiment 100 comprises introducing saltwater having a first temperature and cooling water having a second temperature, which is cooler than the first temperature of the saltwater, into a humidity chamber as illustrated in steps 110 and 112. The temperature difference creates a temperature gradient which establishes an atmosphere suitable for the evaporation of saltwater as illustrated in steps 114 and 116. When the saltwater is evaporated, the salt-free water molecules separate as salt-free water vapor from the salt-related constituent compounds; The salt-free water vapor then condenses as droplets on a salt-free water collection structure as illustrated in step 118. The salt-free water droplets are then collected as illustrated in 120.

FIG. 2 illustrates a schematic of an embodiment 130 of the process for the heating of the saltwater as utilized in the inventive process of the present invention. Embodiment 130 comprises storing saltwater in a saltwater storage container, as illustrated in step 132, then introducing the saltwater into a series of thermal tubes, as illustrated in step 134. The saltwater is then heated to a first temperature and then introduced into a saltwater basin located within the humidity chamber, as illustrated in steps 136 and 138, where it will then evaporate.

FIG. 3 illustrates a schematic of an additional embodiment 140 of the process for the heating of the saltwater as utilized in the inventive process of the present invention. Embodiment 140 comprises introducing saltwater from a saltwater storage container into a saltwater basin located within the humidity as illustrated in steps 142 and 144. The saltwater is then heated to a first temperature by way of a closed loop heated water assembly as illustrated by step 146.

FIG. 4 illustrates a schematic of an embodiment 150 to heat saltwater located within the saltwater basin. As illustrated in steps 152 and 154, water is heated by a flat plate solar collector and stored in an insulated tank. The heated water is then released in to heating coils located within the saltwater basis residing the humidity chamber, as illustrated in steps 156. The saltwater located within the saltwater basin is then heated via the heated water to an acceptable temperature for evaporation as illustrated in steps 158. While the close loop heating process is illustrated as being used independently, those skilled in the art will recognize that this process can be used in combination with other heating processes, such as the thermal tube heating process.

EXAMPLE 1

A series of thermal tubes and copper piping provided saltwater at a temperature of approximately 135° F. and cooling water at a temperature between 70° F. and 105° F. in to a humidity chamber. This created a temperature gradient ranging from 30° F. to 70° F. The amount of salt-free water collected is set out in the following table.

| Temperature Gradient (_t) | Salt-freewater ml/hr (approx.) |
| --- | --- |
| 30 | 350 |
| 40 | 475 |
| 50 | 700 |
| 60 | 780 |
| 70 | 930 |

As shown in FIG. 5, an embodiment 10 of the inventive apparatus comprises a humidity chamber 12, a saltwater structure 20, a cooling water structure 40 and a salt-free water collecting structure 50. Saltwater structure 20 provides saltwater 30 having a first temperature into humidity chamber 12. Cooling water structure 40 provides cooling water 48 having a second temperature which is relatively cooler than the saltwater's temperature into humidify chamber 12. The temperature difference between saltwater 30 and cold water 48 creates a temperature gradient which establishes suitable atmospheric conditions for the evaporation of the saltwater. During this evaporation process, salt-free water evaporates into water vapor while the salt and salt-related constituent compounds do not. The salt-free water vapor then condenses on salt-free water condensing and collection structure 50. The salt-free water condensation is then collected for later use.

Humidity chamber 12 is shown in a general rectangular box configuration having a top 16 a bottom 18 and four side walls 14. While humidity chamber 12 is shown in a generally rectangular configuration, those skilled in the art will understand that such configuration is for illustrative purposes and other various configurations, including, but not limited to a cylindrical configuration, can be utilized and is within the scope of this invention.

One embodiment of saltwater structure as comprising a thermal tube apparatus 27 having a saltwater feed container 28 located outside of the humidity chamber 12, a saltwater basin 26 located within the humidity chamber 12 and one or more thermal tubes 22 which can be located atop humidity chamber 12, each of which are connected by various portions of saltwater feed tube 24. Thermal tubes 22 can be made of any material which can heat saltwater to a sufficient first temperature, such as but not limited to plastic or aluminum. While thermal tubes 22 are illustrated atop humidity chamber 12, those skilled in the art will understand that thermal tubes 22 could be located at some other location still stay within the scope of this invention.

Saltwater 30 is stored within saltwater feed container 28. It is then provided to thermal tubes 22 through a portion of saltwater feed tube 24 where it is heated to a first temperature. After it has been heated, saltwater 30 is then provided into saltwater basin 26 to await evaporation once sufficient atmospheric conditions are created.

Another embodiment of saltwater structure 20 comprises a saltwater feed container 28 located outside of the humidity chamber 12, a saltwater basin 26 located within the humidity chamber 12, each of which are connected by various portions of saltwater feed tube 24, and water heating structure 90. Water heating structure 90 comprises a flat plate solar collector 92 in communication with an insulated tank 94 via a series of heat tubes 96 in a closed loop. One or more heat coils 98 resides within saltwater basin 26. Heating water 93 is stored in insulated tank 94 and is heated by solar collector 92. As heating water 93 flows through heat coils 98, the saltwater 30 which is located within saltwater basin 26 is heated. While a single flat plat solar collector 92 is illustrated, those skilled in the art will understand that more than one collector as well as other types of heating devices could be used and stay within the scope of this invention.

Another embodiment of saltwater structure involves the incorporation of both the thermal tubes apparatus 27 and the water heating structure 90. The thermal tube apparatus 27 is configured and used as set out above. The water heating structure 90 heats and stores heating water 93 in the insulated tank 94 as set out above. During dark periods or extended periods without sunlight, the temperature of saltwater 30 drops. To keep this temperature at an acceptable level, water heating structure 90, through the use of a thermostat controlled valve, circulates heating water 93 through heat coils 98.

Figure 8:
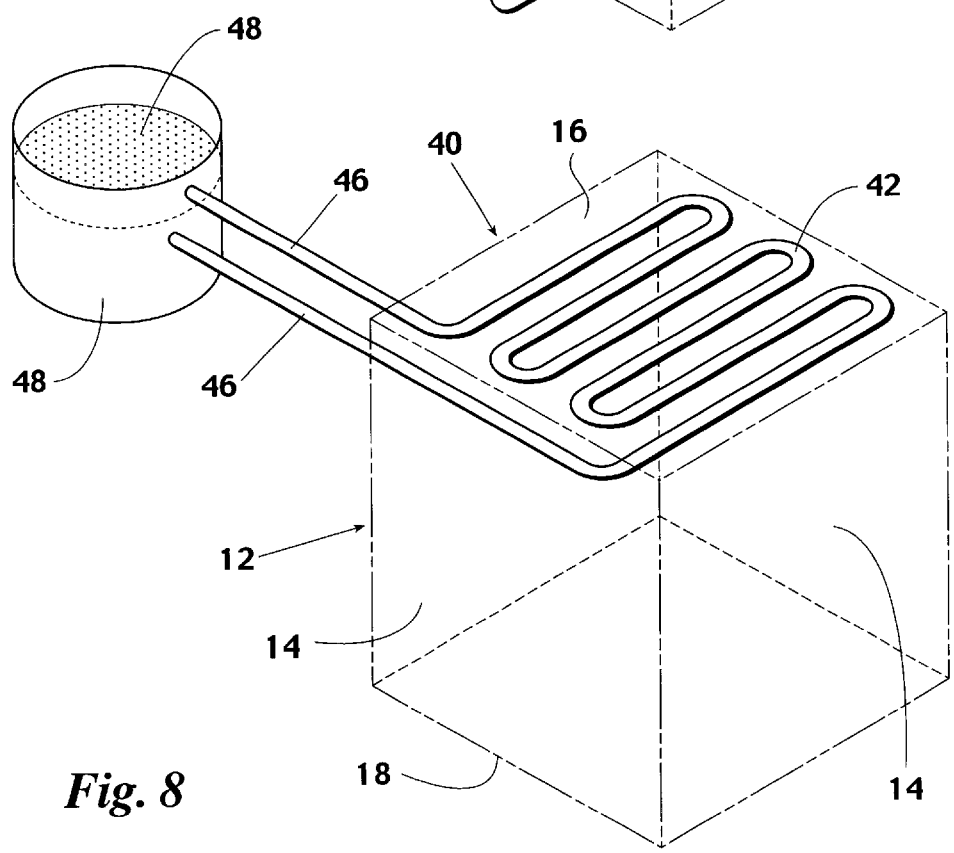
FIG. 8 provides a perspective view of an embodiment of a cooling structure provided by the present invention.
Figure 7:
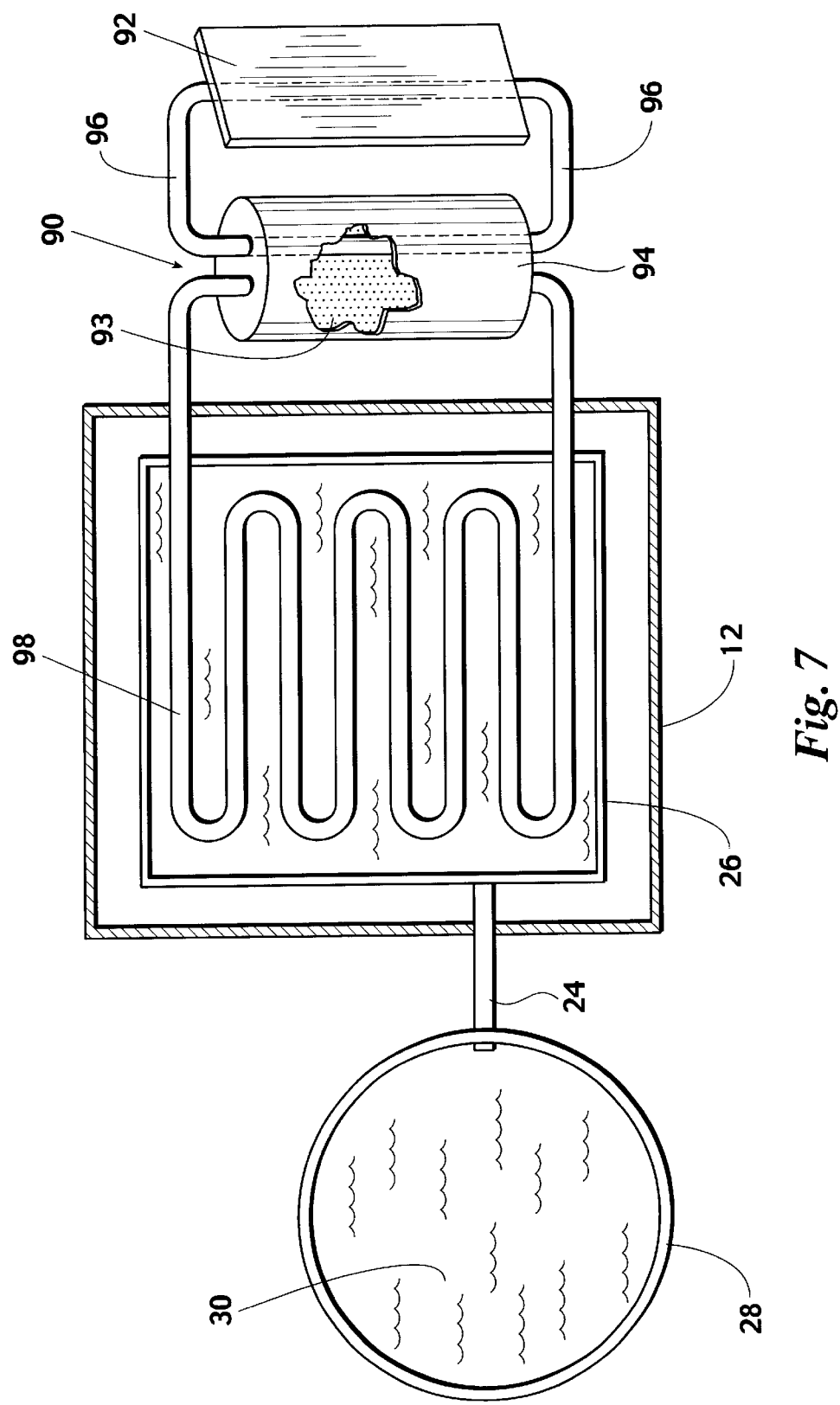
FIG. 7 provides a perspective view of an additional embodiment of a saltwater structure provided by thee present invention.

As shown in FIG. 8, one embodiment of cooling structure 40 comprises a cooling coil 42 located proximate to the top 16 of humidity chamber 12. A cold water feed container 44 provides cold water 48 through the cooling coil 42 through cold water feed tube 46. Cold water 48 has a second temperature which is less than the temperature of saltwater 30, the difference between which creates a temperature gradient.

Cooling coil 42 is generally shown in a general switchback configuration. However, to those skilled in the art, various other configurations are within the scope and spirit of this invention. Additionally, cold water feed tube 46 and saltwater feed tube 24 can be made from any suitable material such as but not limited to copper piping.

Figure 9:
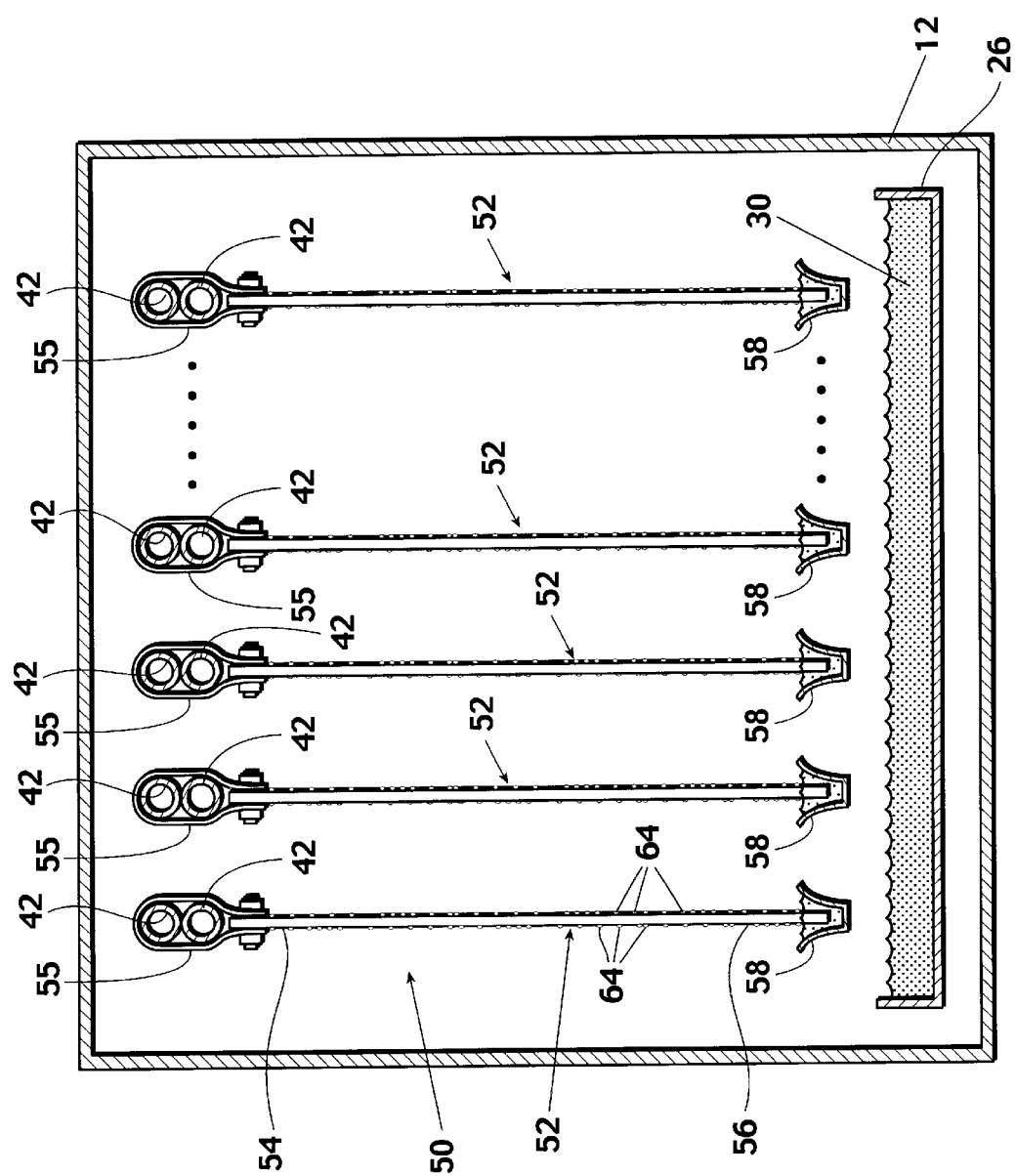
FIG. 9 provides across-sectional view of an embodiment of salt-free water condensation and collection structure provided by the present invention.

As shown in FIGS. 9 and 10, one embodiment of salt-free water condensation and collection structure 50 is illustrated and- comprises a condensation sheet 52 located within humidity chamber 12 between saltwater basin 26 and cooling coil 42. The portion of condensation sheet 52 proximate to cooling coil 42 is referred herein as upper portion 54. The portion of condensation sheet 52 proximate to saltwater basin 26 is referred herein as lower portion 56.

Upper portion 54 is secured to cooling coil 42 by way of a transfer sheet 55. Transfer sheet 55 can be made from any suitable material, such as but not limited to copper. Also, those skilled in the art will recognize that the present invention is limited to by a transfer sheet 55. While the use of transfer sheet 55 is illustrated to connect upper portion 54 to cooling coil 42, those skilled in the art will understand that other known connection devices and methods are within the scope of this invention.

Due to the varying temperatures within the chamber 12, the salt-free water vapor will condense on condensation sheet 52 as salt-free water droplets 64 which cascade down into salt-free water collection trough 58 which is secured to lower portion 56 of condensation sheet 52. The collected salt-free water 64 is then provided into salt-free water collection basin 60 by way of salt-free water collection tube 62.

While this embodiment only illustrates a single collection sheet 52, those skilled in the art will understand that multiple collection sheets 52 and collection troughs 58 can be utilized within the present invention.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claims, including the full range of equivalency to which each element thereof is entitled.

What is claimed is:

1. A process for the desalinization of saltwater comprising the steps of:

introducing saltwater having a first temperature into a humidity chamber comprising,
        storing saltwater in a saltwater feed container;
        introducing said saltwater having said first temperature to a saltwater basin located within said humidity chamber;
        heating said saltwater to said first temperature comprising;
            storing heating water in an insulated tank;
            heating said heating water to a third temperature through the use of at least one solar collectors;
            introducing said heating water to at least one heating coils located within said saltwater basin thereby heating said saltwater to said first temperature;
    introducing cooling water having a second temperature into said humidity chamber, wherein the difference between said first temperature and said second temperature creates a temperature gradient which causes evaporation of said saltwater during which salt-free water molecules evaporates into water vapor and separate from the salt and salt-related constituent compounds contained within said saltwater;
    providing a surface to allow said salt-free water vapor to form a condensed salt free water; and
    collecting said condensed salt free water.

2. The process of claim 1, wherein the introduction of said saltwater can occur before or after the introduction of said cooling water into said humidity chamber.

3. The process of claim 1, further comprising the step of:
    maintaining said temperature gradient at substantially the same temperature.

4. The process of claim 1, further comprising the step of:
    maintaining said temperature gradient between a range of 50 and 75 degrees Fahrenheit.

* * * * *